INVENTOR
HAROLD A. ROSEN
BY H. Vincent Hersha
ATTORNEY

April 10, 1962  H. A. ROSEN  3,029,427
FEED-THROUGH NULLING SYSTEMS
Filed July 10, 1958  2 Sheets-Sheet 2
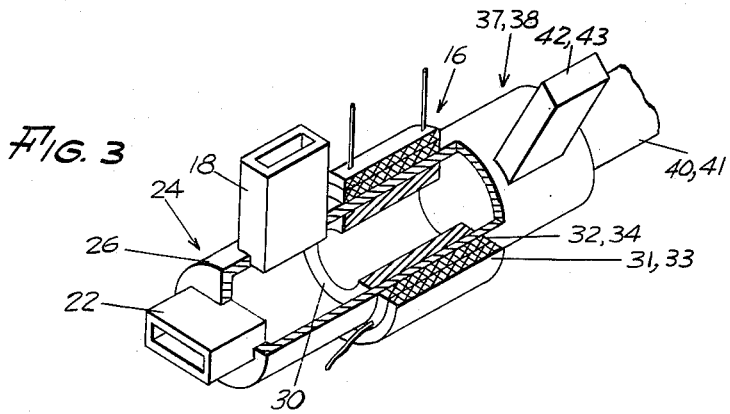
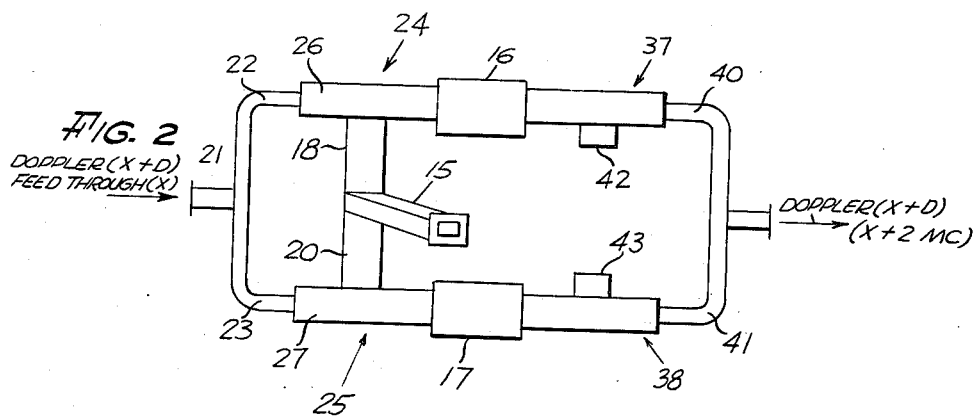
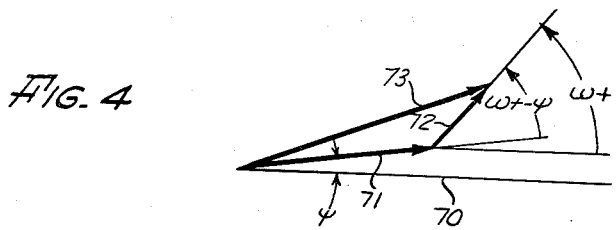
INVENTOR
HAROLD A. ROSEN
BY N. Vincent Harsha
ATTORNEY 3,029,427
Patented Apr. 10, 1962

3,029,427
FEED-THROUGH NULLING SYSTEMS
Harold A. Rosen, Santa Monica, Calif., assignor to Raytheon Company, a corporation of Delaware
Filed July 10, 1958, Ser. No. 748,569
6 Claims. (Cl. 343—8)

This invention relates to an automatic feed-through nulling system for a Doppler radar and more specifically to such a system using a pair of ferrite modulators to produce a single side band signal by combining the transmitted and received signals and those from two local oscillators which is compared in phase with the output of the lower frequency local oscillator directly in one detector and after a 90° phase shift in the other detector to produce D.C. signals which are applied to the ferrite modulators in such a way as to cancel out any excessive feed-through energy.

In a Doppler-type radar the output signal from the transmitter is a continuous or almost continuous wave of energy which is changed in frequency by reflection from a moving target. This change in frequency is called the Doppler effect and is detected by continuously comparing the frequency of the incoming reflected signal with that of the outgoing transmitted signal. The resulting signal at the difference or Doppler frequency is then fed to a receiver. Since it is necessary for the received signal to be continuously compared with the transmitted frequency, there must of necessity be close coupling between the transmitter and the receiver. This results in a portion of the transmitted energy being fed to the receiver. This energy regardless of how it is coupled to the receiver is what is referred to herein as the feed-through signal. Unfortunately, this feed-through signal, if not controlled, results in saturation of the receiver and in degradation of the system sensitivity. This problem is especially severe where the same antenna is used for both transmitting and receiving by means of a duplexer. The result has been that Doppler radars have been limited in available output power in order to obtain a proportional reduction in feed-through signal.

By the present invention, feed-through nulling has been accomplished by the use of two ferrite modulators arranged as single side band modulators with the received energy applied to the modulator together with the transmitted radiant energy and locally generated energy at a second or pilot frequency applied in phase quadrature and, in addition, a D.C. signal derived by comparing an I.F. signal derived by mixing the output of the modulator with a signal at a third frequency from a third local oscillator in phase with a signal from the second source directly and shifted in phase by 90° to produce an error or nulling signal for excessive feed-through energy. In this system the output of the radar need not be limited by any necessity to reduce the feed through.

The foregoing and other advantages and features of the invention will be better understood from the following description taken in conjunction with the accompanying drawings wherein:

FIG. 2 is a simplified isometric drawing of the microwave circuitry of the feed-through nulling device of the system of FIG. 1;

FIG. 3 is a simplified isometric drawing partly in section of one of the modulators of FIG. 2; and FIG. 4 is a vector diagram of the output of the modulator.

Figure 1:
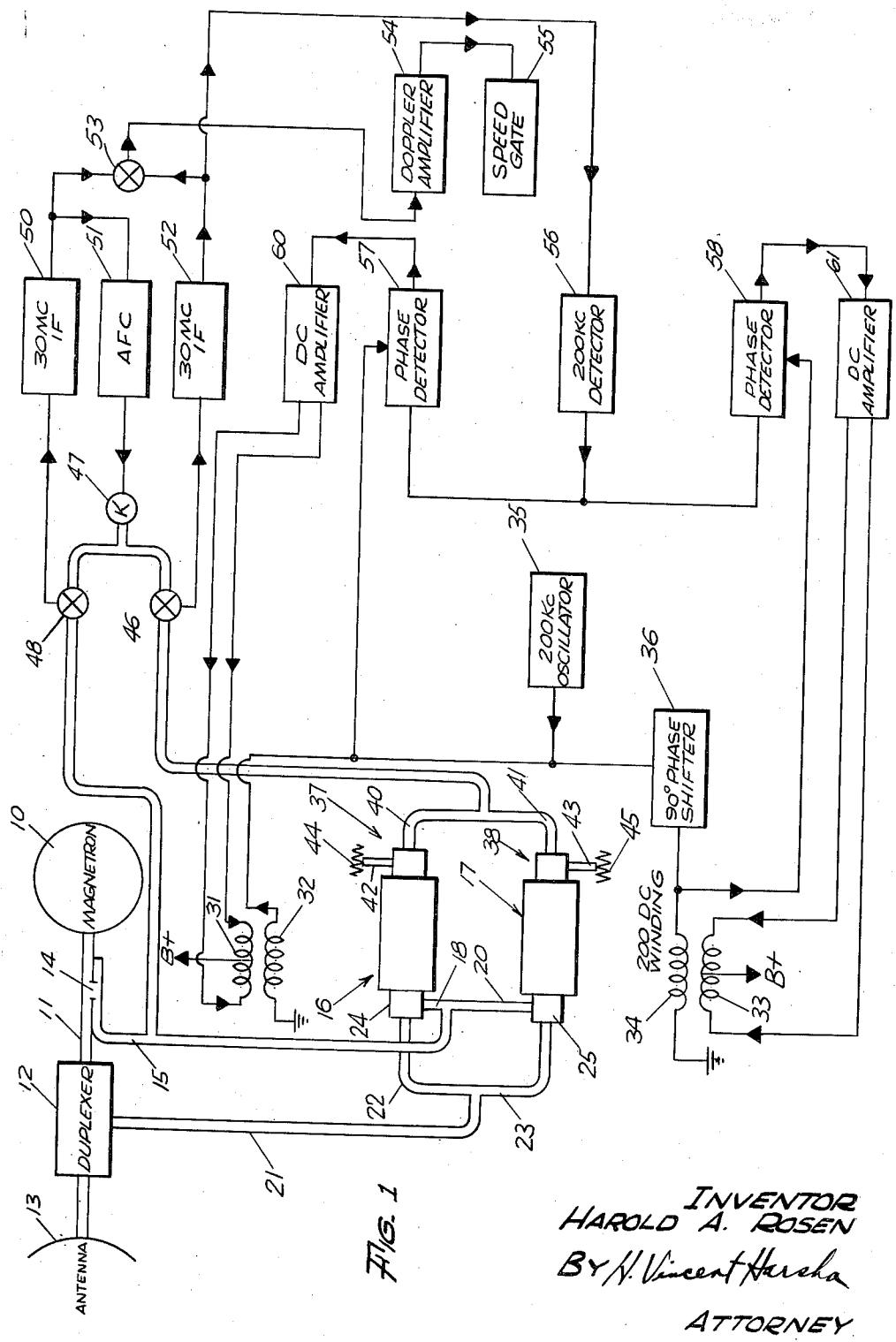
FIG. 1 is a schematic diagram of a system embodying the invention.

In FIG. 1 the reference numeral 10 designates a C.W. magnetron or other oscillator connected by waveguide 11 and duplexer 12 to antenna 13. Part of the microwave energy from the magnetron 10 is connected through directional coupler 14 and waveguide 15 to the ferrite modulators 16 and 17. The branch 18 of the guide 15 feeding the modulator 16 is made shorter than the branch 20 feeding the modulator 17 by a quarter wavelength at the oscillator frequency so that the magnetron energy is fed to these modulators in phase quadrature. Reflected energy received by the antenna 13 from the target, shifted in frequency by the Doppler effect, is transmitted through the duplexer 12 to the ferrite modulators 16 and 17 through waveguide 21 and branches 22 and 23 of equal length.

The operation of the modulators can best be understood by reference to FIGS. 2 and 3. Signals from the magnetron 10 and the antenna 13 are applied to the modulators 16 and 17 through duplexers 24 and 25. The devices comprise, as best seen in FIG. 3, a section of square or round waveguide 26 or 27 in which microwave energy may be propagated in two polarities at right angles to each other. The rectangular guides 18, 20, 22, and 23 are so dimensioned that energy inserted into the duplexers 24 and 25 by one guide polarized in one plane cannot be propagated in the other guide which only propagates energy polarized in a different plane. Such duplexers are more fully illustrated in FIG. 8.45 and described on page 369 of "Microwave Duplexers" by Smullin and Montgomery, Volume 14 of the "Radiation Laboratory Series." Each of these modulators comprises a gyrator having a piece of ferrite 30, preferably in tubular form, and two magnetizing coils 31 and 32 or 33 and 34 arranged about each of these waveguides in the region of the ferrite 30. One set of these coils 31 and 33 are supplied with a direct current obtained in a manner to be described and the other set of these coils 32 and 34 are supplied with an alternating current from a pilot signal oscillator 35 at a frequency of 200 kc., for example, that supplied to the coil 34 is shifted 90° in phase by a phase shifter 36. The modulators 16 and 17 are each coupled to a second duplexer 37 or 38 having rectangular output waveguides 40 and 41 arranged to propagate radio frequency energy at the received signal frequency only when the ferrites 30 are magnetized and to waveguides 42 and 43, which are terminated in loads 44 and 45, and arranged to propagate and absorb radio frequency energy at the received signal frequency when the ferrites are not magnetized. The waveguides 40 and 41 supply mixer 46. The mixer 46 also receives energy from a local oscillator, a klystron 47, for example, most conveniently operated at a frequency displaced from the frequency of the magnetrons 10 by the usual radar I.F., 30 mc. The local oscillator 47 also supplies energy to a second mixer 48 that also receives energy from the magnetron 10 to produce an output at the I.F. frequency that is amplified in I.F. amplifier 50. A portion of the output of the I.F. amplifier 50 is supplied to an AFC circuit 51 to generate a frequency control voltage for the local oscillators 47. The output of the mixer 46 differing from the output of the mixer 48 by the Doppler frequency and the frequency of pilot oscillator 35 is amplified in amplifier 52 and mixed with the amplified output of mixer 48 in a third mixer 53 to produce the Doppler frequency which after amplification in the amplifier 54 is utilized in the speed gate 55 to indicate the relative speed of the radar and the target.

A portion of the output of amplifier 52 containing signals at the 200 kc. frequency of the oscillator 35 which may be shifted in phase by the modulators 16 and 17 is applied to the detector 56 where the 200 kc. pilot signal is extracted and applied to two phase detectors 57 and 58. The phase detector 57 also receives a portion of the output of oscillator 35 directly. The phase detector 58 receives a portion of the output of the oscillator 35 shifted in phase by the phase shifter 36. The outputs of these phase detectors 57 and 58 is a direct current if the applied signals are out of phase. These phase detectors may be of the type illustrated in FIG. 35-V and described on page 322, paragraph 30 of "The Electronic Control Handbook" by Batcher and Moulic. The outputs of the phase detectors 57 and 58 are amplified by integrating D.C. amplifiers 60 and 61, respectively, to produce the direct current referred to above which is applied to coils 31 and 33 of the modulators 16 and 17, respectively. When the signals are out of phase in one direction, current flows in one section of each coil, and when they are out of phase in the other direction, current flows in the other section.

When current appears in any of the coils 31, 32, 33 and 34, the ferrites 30 are magnetized and produce a rotation of the plane of polarization of the microwave energy propagating through them in a direction dependent on the direction of the magnetic field caused by the current flow in the coils. The polarization of the radio frequency energy from the magnetron propagating in the modulator is such that, without any current flowing in the coils, none of this energy will reach the output, but will be dissipated in the loads 44 and 45. When sufficient current flows in coils 31 and 32 of the modulator 16 to rotate the polarization of the propagating energy through an angle of $\theta_1°$, energy is transmitted to the output by a factor $\sin^2 \theta_1$, and to the load 44 by a factor $\cos^2 \theta_1$. Expressed another way the voltage transmission factor of energy reaching the output of the modulator is $\sin \theta_1$ which reverses in sign when $\theta_1$ reverses. The same applies to the modulator 17 which supplies radio frequency energy in an amount determined by the polarization rotation angle $\theta_2$ of modulator 17. Thus, an RF signal of any phase and of an amplitude in excess of a minimum portion of the transmitted signal from the magnetron 10 can be added to the received I.F. signal at the mixer 46 by properly choosing $\theta_1$ and $\theta_2$.

Since the transmitted microwave signals entering via waveguide 15 are in phase quadrature, the received signals entering the guide 21 are in phase, and the 200 kc. modulating signals applied to the coils 32 and 34 are also in phase quadrature, the sum of these signals at the input to mixer 46 is a single frequency pilot signal displaced 200 kc. from the magnetron frequency. This is shown by the identity $$\cos(\omega_x - \omega_M)t = \cos \omega_x t \cos \omega_M t + \sin \omega_x t \sin \omega_M t$$

where $x$ = magnetron frequency
$M$ = 200 kc.

The two terms on the right are the signals transmitted by the gyrators or modulator due to the pilot signal modulation, while the term on the left is their single frequency sum. This displacement is determined by the frequency of the output of the pilot signal oscillator 35. The phase of the fundamental component of the modulation is determined by the phase of the feed-through, as best seen in the vector diagram of FIG. 4. The reference phase is indicated by line 70. The feed-through energy from the magnetron is indicated by the arrow 71 at an angle $\psi$ representing the phase of this energy. The pilot signal is represented by the arrow 72 at an angle $\omega t$ to the reference representing its phase at an angle $\omega t - \psi$ to the feed-through energy. The single side band frequency modulated wave generated in the modulator is indicated by the arrow 73. The envelope of this modulated wave has a phase angle determined by the phase of the feed-through signal and an amplitude determined by the smaller of the feed-through and pilot signals.

The time constants of the system are selected so that the lowest Doppler frequencies of interest are not inordinately degenerated.

This completes the description of the embodiment of the invention illustrated herein. However, many modifications and advantages thereof will be apparent to persons skilled in the art without departing from the spirit and scope of this invention. Accordingly, it is desired that this invention will not be limited to the particular details of the embodiment disclosed herein except as defined by the appended claims.

What is claimed is:

1. In a Doppler radar system a first source of radiant energy at a first frequency, means for propagating and receiving such energy, a pair of modulators, a second source of radiant energy at a second frequency, means to apply the output of said first radiant energy source to the modulators in phase quadrature, means to apply the received energy to the modulators, means to apply the output of said second radiant energy source to said modulators in phase quadrature, a third source of radiant energy at a third frequency, means to mix the output from the third source with the output of the first source, means to mix the output from the third source with the outputs from the modulators, means to compare the output from this last-mentioned mixing means with the output of the second source directly and shifted 90° in phase, means to apply the output of each phase comparison means to one of said modulators, and mixing means for the outputs of the two last mentioned mixing means to obtain a signal determined by the difference in frequency of the transmitted and received signal without excessive energy at the transmitted frequency.

2. In a Doppler radar system a first source of radiant energy at a first frequency, means for propagating and receiving such energy, a pair of microwave modulators, a second source of radiant energy at a second frequency, means to apply the output of said first radiant energy source to the modulators in phase quadrature, means to apply the received energy to the modulators, means to apply the output of said second radiant energy source to said modulators in phase quadrature, a third source of radiant energy at a third frequency, means to mix the output from the third source with the output of the first source, means to mix the output from the third source with the output from the modulators, means to compare the output from this last mentioned mixing means with the output of the second source directly and shifted 90° in phase, means to apply the output of each phase comparison means to one of said modulators, and mixing means for the output of the two last mentioned mixing means to obtain a signal determined by the difference in frequency of the transmitted and received signal without excessive energy at the transmitted frequency.

3. In a Doppler radar system a first source of radiant energy at a first frequency, means for propagating and receiving such energy, a pair of modulators comprising ferrite microwave gyrators, a second source of radiant energy at a second frequency, means to apply the output of said first radiant energy source to the modulators in phase quadrature, means to apply the received energy to the modulators, means to apply the output of said second radiant energy source to said modulators in phase quadrature, a third source of radiant energy at a third frequency, means to mix the output from the third source with the output of the first source, means to mix the output from the third source with the output from the modulators, means to compare the output from this last mentioned mixing means with the output of the second source directly and shifted 90° in phase, means to apply the output of each phase comparison means to one of said modulators, and mixing means for the output of the two last mentioned mixing means to obtain a signal determined by the difference in frequency of the transmitted and received signal without excessive energy at the transmitted frequency.

4. In a Doppler radar system a first source of radiant energy at a first frequency, means for propagating and receiving such energy, a pair of modulators comprising ferrite microwave gyrators, a second source of radiant energy at a second frequency, means to apply the output of said first radiant energy source to the modulators in phase quadrature, means to apply the received energy and said output of said first radiant energy source to the modulators in cross-polarization, means to apply the output of said second radiant energy source to said modulators in phase quadrature, a third source of radiant energy at a third frequency, means to mix the output from the third source with the output of the first source, means to mix the output from the third source with the output from the modulators, means to compare the output from this last mentioned mixing means with the output of the second source directly and shifted 90° in phase, means to apply the output of each phase comparison means to one of said modulators, and mixing means for the output of the two last mentioned mixing means to obtain a signal determined by the difference in frequency of the transmitted and received signal without excessive energy at the transmitted frequency.

5. In a Doppler radar system a first source of radiant energy at a first frequency, means for propagating and receiving such energy, a pair of modulators, a second source of radiant energy at a second frequency, means to apply the output of said first radiant energy source to the modulators in phase quadrature, means to apply the received energy to the modulators, coil means to apply the output of said second radiant energy source to said modulators in phase quadrature, a third source of radiant energy at a third frequency, means to mix the output from the third source with the output of the first source, means to mix the output from the third source with the output from the modulators, means to compare the output from this last mentioned mixing means with a portion of the output of the second source directly and shifted 90° in phase, means to apply the output of each phase comparison means to one of said modulators, and mixing means for the output of the two last mentioned mixing means to obtain a signal determined by the difference in frequency of the transmitted and received signal without excessive energy at the transmitted frequency.

6. In a Doppler radar system a first source of radiant energy at a first frequency, means for propagating and receiving such energy, a pair of microwave modulators comprising ferrite microwave gyrators, a second source of radiant energy at a second frequency, means to apply the output of said first radiant energy source to the modulators in phase quadrature, means to apply the received energy and said output of said first radiant energy source to the modulators in cross-polarization, coil means to apply the output of said second radiant energy source to said modulators in phase quadrature, a third source of radiant energy at a third frequency, means to mix the output from the third source with the output of the first source, means to mix the output from the third source with the output from the modulator, means to compare the output from this last mentioned mixing means with a portion of the output of the second source directly and shifted 90° in phase, means to apply the output of each phase comparison means to one of said modulators, and mixing means for the output of the two last mentioned mixing means to obtain a signal determined by the difference in frequency of the transmitted and received signal without excessive energy at the transmitted frequency.

References Cited in the file of this patent
UNITED STATES PATENTS
2,755,463    Richmond  ------------- July 17, 1956